United States Patent [19]

Castellano

[11] 4,097,056
[45] Jun. 27, 1978

[54] MODULAR PART CART

[76] Inventor: Paul Eugene Castellano, Wyoming, Minn.

[21] Appl. No.: 756,413

[22] Filed: Jan. 3, 1977

[51] Int. Cl. ................................................ B62b 3/02
[52] U.S. Cl. .......................... 280/47.35; 280/33.99 R
[58] Field of Search ................... 280/79.3, 79.2, 47.35, 280/33.99 R, 33.99 M, 33.99 S; 108/24; 220/4 F

[56] References Cited

U.S. PATENT DOCUMENTS

| | | | |
|---|---|---|---|
| 2,022,591 | 11/1935 | Everitt | 108/24 |
| 2,903,269 | 9/1959 | Hennion | 280/47.35 |
| 3,266,656 | 8/1966 | Kridle | 220/4 F |
| 3,999,774 | 12/1976 | Rehrig | 280/79.1 |

FOREIGN PATENT DOCUMENTS

| | | | |
|---|---|---|---|
| 2,309,418 | 10/1975 | France | 220/4 F |

*Primary Examiner*—Robert R. Song
*Attorney, Agent, or Firm*—S. Pal Asija

[57] ABSTRACT

A multi purpose modular part cart comprising an upper frame unit, a lower frame unit, a drip catch pan, plurality of adjustable telescopic tubes, plurality of removeable side panels and plurality of casters attached to the lower frame unit. The upper frame unit rests on the lower frame unit and the drip catch pan rests on brackets welded to the base of the lower frame unit.

With all side panels in position, the upper frame unit serves as a basket, which in combination with the lower frame unit facilitates loading, transportation and unloading of industrial parts conveniently, expeditiously and economically. The modular part cart of this invention is designed for ease of assembly and compactness of storage space.

1 Claim, 3 Drawing Figures

MODULAR PART CART

BACKGROUND OF THE INVENTION

1. Field of the Invention

This invention relates to an improvement in utility carts especially suited for loading, unloading and transportation of oily industrial parts.

2. Brief Description of the Prior Art

Utility carts of the prior art such as Bloomfield U.S. Pat. No. 3,698,735; Hill U.S. Pat. No. 3,104,890; Webber U.S. Pat. No. 2,830,825; Moran U.S. Pat. No. 2,782,047; Berlin U.S. Pat. No. 2,901,262; Koepke U.S. Pat. No. 2,745,673; Young U.S. Pat. No. 2,555,178; Shackel U.S. Pat. No. 3,037,786; McDonald U.S. Pat. No. 3,262,712 and Huffman U.S. Pat. No. 3,052,484 are not suited for transportation of oily industrial parts conveniently or economically.

The present invention incorporates several new and useful improvements over the prior art. The modular part cart of this invention facilitates loading, transportation and unloading of industrial parts conveniently, expeditiously and economically. A drip catch pan to collect the oil or grease dripping from the parts is provided at the base.

SUMMARY OF THE INVENTION

The modular part cart of this invention comprises an upper frame unit, a lower frame unit and a drip catch pan. The upper frame unit comprises plurality of adjustable telescopic tubular structures, removeable side panels and a swivel back panel. Likewise the lower frame unit comprises plurality of adjustable telescopic tubular structures and plurality of casters provided for ease of transportation.

The upper frame unit rests on the lower frame unit which can be separated or joined together without the use of any tools. With the side panels in position the upper frame unit forms a basket. The drip catch pan to collect the oil or grease dripping from the parts is provided at the base which rests on the lower frame unit.

The back panel is hinged over a rod attached to the upper frame unit to facilitate storage of such part carts when not in use in a compact space.

The strength, size and shape of the modular part cart may be varied merely by substitution of tubular frames of corresponding strength, size and shape.

DETAILED DESCRIPTION OF THE PREFERRED EMBODIMENT

Figure 1:
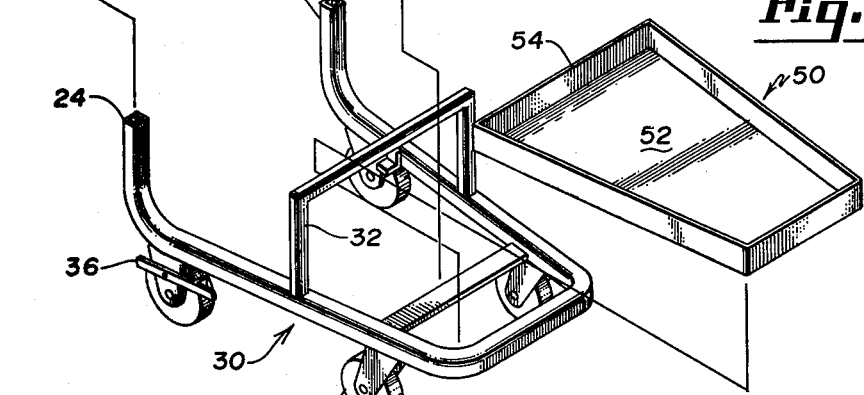
FIG. 1 is a pictorial view of the part cart of this invention with parts separated.

An embodiment of the modular part cart of this invention comprises an upper frame unit 10, a lower frame unit 30 and a drip catch pan 50 and as can be seen from FIG. 1, each unit incorporates plurality of mechanical elements.

The upper frame unit 10 comprises plurality of telescopic tubular structures formed into a handle 15, a base frame 20 and perpendicular tubes 12 with slots 13 so as to be receptacle for side panels 14. In addition a back panel 18 is pivotally attached to a rod 16 under the handle 15 such that the back panel freely swings open inwards when pushed from outside. A portion of the tubular structure under the handle 15 extends below the bottom frame 20 and has cross sectional area smaller than the cross sectional area of the tubular structure of which the lower frame unit 30 is made of such that the tubular structure 22 fits snugly inside the tubular structure 24 corresponding to upper and lower frame units 20 and 30 respectively.

The lower frame unit 30 comprises tubular structure 24, support member 32, plurality of casters 34 with brake arrangement 36. The support member 32 is positioned approximately in the center of the lower frame unit bridging its width. The shape and size of the lower frame unit 30 made of tubular structure 24 is such that the upper frame unit can be slid into the lower frame unit without the use of any tools.

The drip catch pan 50 having base 52 and sides 54 so as to become a leak proof pan rests on the lower frame unit 30 under the support bridge in the form of an inverted 'U' 32 with the open side of the drip catch pan facing the upper frame unit 10.

Figure 2:
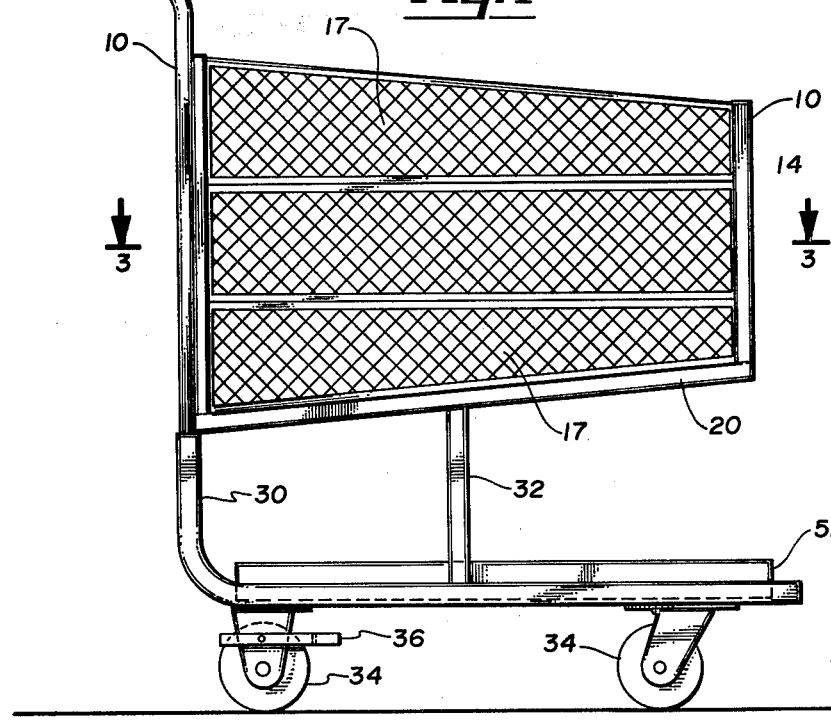
FIG. 2 is a side view of the assembled modular part cart of the invention.

FIG. 2 shows a side view of the assembled modular part cart of this invention. Each side comprises plurality of side panels 14, 17. The entire structure is so formed and assembled so as to have a narrower crossection at the front end than at the back end with handle 15. Accordingly the bottom and top sections of the side panels are of oblong shape and the middle panel of rectangular shape. The side panels can be made of wire cloth such as made by McNichols Co or of expanded metal such as made by Wheeling co. In the preferred embodiment approximately 10° of slope was used at the top and bottom ends of the basket of the modular part car of this invention. The basket is formed merely by inserting the appropriate side panels in the upper frame unit via the slots 13 provided in the tubular members 12 for this purpose. Plurality of side panels have been provided to facilitate loading and unloading of parts in and from the basket at suitable height. As for example by removing all three side panels all the parts can be slid off. The basket 10 is designed such that it can be transported by overhead cranes so as to obviate the need for duplicate storage and transportation containers. This is done merely by adding hooks to the basket 10 which mate the hooks of the overhead cranes of that particular installation. The side panels on the shorter side the front end of the basket 10 are all rectangular in shape as the slope of the basket or the upper frame unit 10 does not affect or alter their shape.

Figure 3:
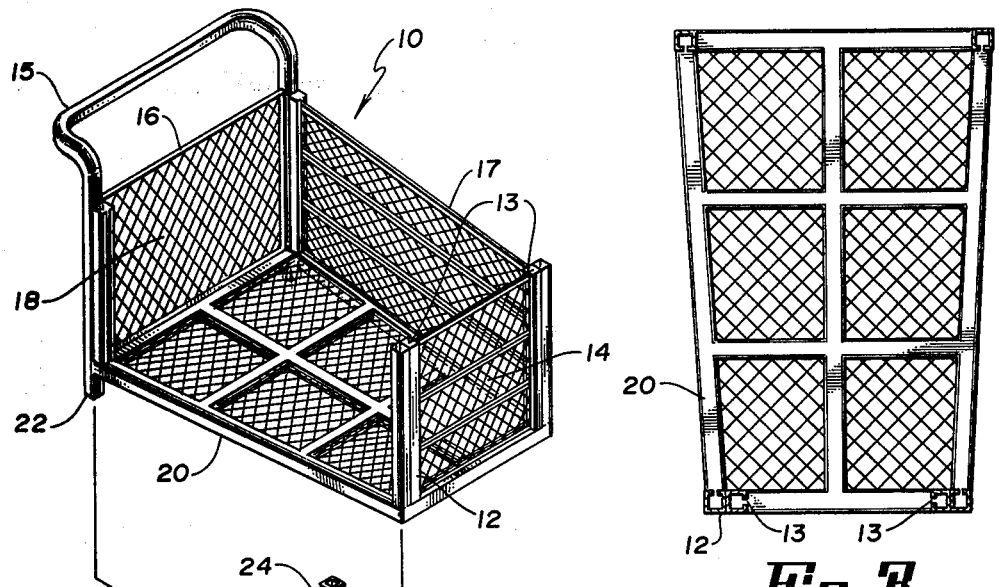
FIG. 3 is a section along lines 3—3 of FIG. 2, which is a top view of the bottom frame of the basket to wit the upper frame unit.

FIG. 3 shows a section along lines 3—3 of FIG. 2, which is a top view of the bottom frame 20, which is a part of the upper frame unit 20.

The tubular structure can be metalic hollow square shape such as made by Ryerson Co or by Metal-Matic Inc. The casters can be swivel type such as by Colson 44-4109-439 or rigid type such as Colson 44-4108-439.

Side panels are made of wire cloth, expanded metal or mesh for reasons of its light weight and strength in the preferred embodiment but solid panels may be used without deviating from the spirit of this invention.

Following is a numerical index of elements used in the preferred embodiment with appropriate commercial identification for ready reference.

10 = The basket = The upper frame unit.
12 = Tubular structures such as Metal-Matic.
13 = Slot along the length of the tube 12.

14 = Side panels.
15 = Handle formed from tube 12.
16 = A rod for pivotally supporting back panel.
17 = Oblong side panel made of wire cloth by McNichols Co or Wheeling Expanded Metal.
18 = The back panel.
20 = The bottom frame of the upper frame unit.
22 = Tube of upper frame unit of crossectional area larger than the tube of lower frame unit.
24 = Tube of lower frame unit.
30 = Lower frame unit.
32 = Support member bridge in the form of an inverted 'U'
34 = Casters rigid such as 44-4108-439 made by Colson. or swivel for back end as Colson 44-4109-439.
36 = Brake arrangement for the casters.
50 = The drip catch pan.
52 = Base of the drip catch pan.
54 = Sides of the drip catch pan.

Other features may be added to the part cart of this invention without deviating from the spirit of this invention and improvements over the prior art.

I claim:

1. A modular part cart for loading, transporting, and unloading of oily industrial parts conveniently, expeditiously and economically comprising:
   (a) a lower frame unit;
   (b) an upper frame unit slideably mounted over said lower frame unit; and
   (c) a drip catch pan inserted between said lower frame unit and said upper frame unit; and
wherein said lower frame unit comprises;
   (a) a tubular frame in 'U' shape with perpendicular ends;
   (b) a plurality of casters fastened to said 'U' shaped tubular frame in a direction opposite to said perpendicular ends; and
   (c) an inverted 'U' shaped support member bridging the width of said 'U' shaped tubular frame;
and wherein said upper frame unit comprises:
   (a) a rectangular bottom frame having a mesh;
   (b) plurality of perpendicular tubular members fastened perpendicular to said rectangular bottom frame;
   (c) a handle fastened to one side of said rectangular bottom frame above said perpendicular tubular members; and
   (d) plurality of slideably removeable side panels of mesh for easy loading and unloading of parts;
and wherein
   (a) a back panel is pivotally attached to said upper frame unit under said handle via a rod;
   (b) said bottom frame of said upper frame unit has additional tubular frame members fastened parallel to its sides; and
   (c) said plurality of perpendicular tubular members of said upper frame unit have slots for sliding sections of said plurality of side panels of mesh.

* * * * *